Oct. 23, 1962 J. J. NYBERG 3,060,323
SUPERCONDUCTIVE ELECTRICAL CIRCUITS FOR STORAGE AND READ OUT
Filed Sept. 12, 1957
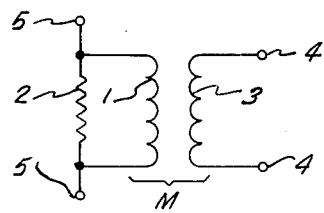
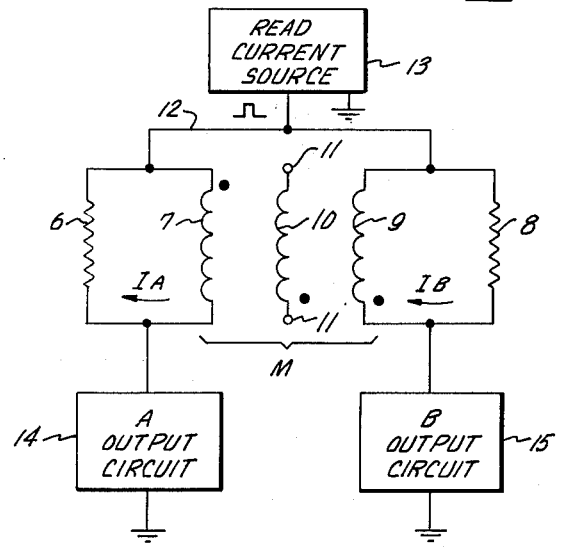
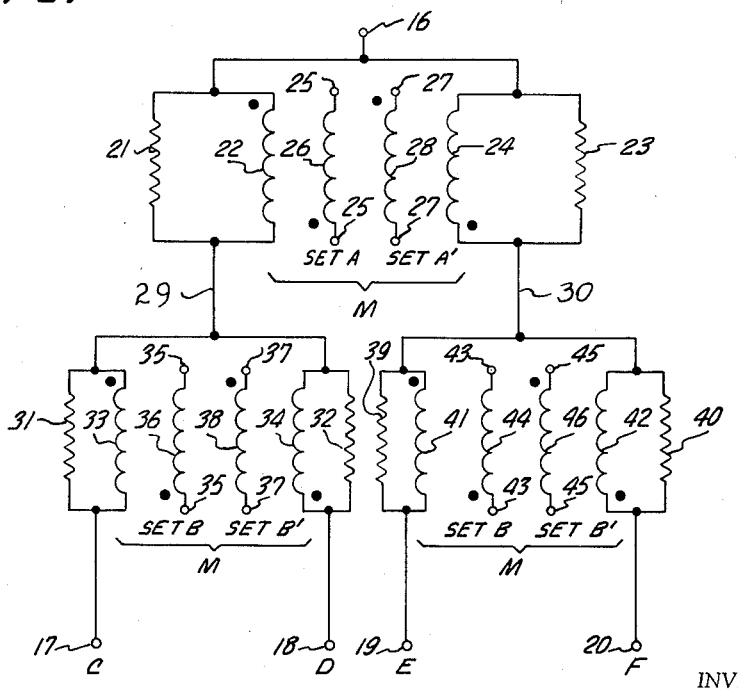
INVENTOR.
JAMES J. NYBERG
BY Robert H. Frasen
ATTORNEY.

United States Patent Office 3,060,323
Patented Oct. 23, 1962

3,060,323
SUPERCONDUCTIVE ELECTRICAL CIRCUITS FOR STORAGE AND READ OUT
James J. Nyberg, Torrance, Calif., assignor, by mesne assignments, to Thompson Ramo Wooldridge Inc., Cleveland, Ohio, a corporation of Ohio
Filed Sept. 12, 1957, Ser. No. 683,525
15 Claims. (Cl. 307—88.5)

This invention relates to electrical circuits including superconductive circuit elements and more particularly to a new and improved electrical circuit including superconductive circuit elements in which selected conditions established within the circuit govern the path of an electrical current.

In digital computing and data processing equipment in which informating is handled by means of electrical signals representing digital values, it is well known to employ circuits which control the path of an electrical current in accordance with the occurrence or concurrence of conditions established within the circuit. When the electrical current represents information, a combination of such circuits may be arranged to perform a computation or manipulation in accordance with a logical system. Accordingly, the circuits are known as "logical circuits."

In a co-pending United States patent application entitled "Superconductive Electrical Circuits," filed June 5, 1957, Serial No. 663,668, in the name of Eugene C. Crittenden, Jr., there is described an electrical circuit constructed of superconductive materials which is capable of sustaining a persistent circulating current flow around a loop indefinitely so long as the entire circuit remains superconducting. By virtue of the capacity of the circuit loop in sustaining a current, a device may be constructed for storing information as a function of the direction of persistent current flow, with the direction of current flow being ascertainable by applying a sensing pulse to the loop which renders a portion of the loop electrically resistive when the sensing pulse is additive with respect to the persistent current flow through that portion. Thus, to read the stored information, a sensing pulse may be applied to the loop and the appearance of a voltage across the electrically resistive portion indicates a persistent circulating current in one direction while the absence of a voltage pulse indicates that the direction of persistent current flow is in the opposite direction. However, the appearance of the voltage pulse may function to reverse the direction of persistent current flow with a consequent destruction of the information stored in the circuit loop after a reading operation is completed.

It is one object of the present invention to provide an electrical circuit utilizing superconductive components for controlling the flow of an electrical current in accordance with the occurrence or concurrence of conditions existing within the circuit.

It is another object of the present invention to provide a new logical circuit for use in data processing systems and digital computers.

It is an additional object of the present invention to provide an electrical circuit including superconductive circuit loops from which information may be derived without affecting the direction of persistent current flow.

Briefly, in accordance with the invention there is provided an electrical circuit which includes at least two superconductive components in each of which a persistent current flows having a value less than the critical current value of the component so long as the component remains superconducting, with the components being arranged so that the direction of persistent current flow in one of the components is at all times opposite to the direction of persistent current flow in at least one other of the components whereby a signal current may be passed through the circuit via at least one of the superconductive components in a direction which is subtractive with respect to the direction of persistent current flow therethrough. In a particular embodiment, a pair of super-conductive circuit loops are arranged so that persistent circulating currents are sustained within the circuit loops in mutually opposite directions. By applying a signal or "read" current to both of the loops in parallel, the applied current passes through a portion of one of the circuit loops in which the applied current is subtractive with respect to the persistent circulating current flow so that a relatively small part of or none of the applied current flows through a portion of the other circuit loop in which the applied current is additive with respect to the persistent circulating current flow.

A better understanding of the invention may be had from a reading of the following detailed description and an inspection of the drawings in which:

FIG. 1 is a schematic circuit diagram of a superconductive circuit loop which may be used in the electrical circuit of the invention;

FIG. 2 is a combined block and schematic circuit diagram of an electrical circuit constructed in accordance with the invention; and FIG. 3 is a schematic circuit diagram of one example of an electrical circuit of the invention for performing a logical function in accordance with the concurrence of conditions established in the circuit.

At temperatures near absolute zero, some materials lose all resistance to the flow of electrical current and become perfect conductors. The phenomenon is called superconductivity and the temperature at which the change occurs from a normally resistive state to a superconductive state is called the transition temperature. It has been established that where a material is held at a temperature below its transition temperature the superconductive state may be extinguished by the application of an external magnetic field to the material or by current flow through the material in an amount in excess of a critical current value. A discussion of the phenomenon of superconductivity and many of the materials which are capable of becoming superconductive may be found in a book entitled "Superconductivity" by D. Schoenberg, Cambridge University Press, Cambridge, England, 1952, and in the aforesaid co-pending patent application of Eugene C. Crittenden, Jr.

FIG. 1 illustrates one type of electrical circuit loop described in the aforesaid co-pending application which is adapted to operate in accordance with the foregoing principles. The circuit of FIG. 1 includes a first conductor in the form of an inductance 1 and a second conductor in the form of a resistance element 2 connected to form a circuit loop. Both the inductance 1 and the resistance element 2 are constructed of materials which are superconductive at the operating temperature of the circuit. However, the resistance element 2 is constructed of a material having a critical current value at which the material switches from a superconductive state to a resistive state lower than the critical current value at which the inductance 1 switches from a superconductive state to a resistive state.

In operation, the electrical circuit of FIG. 1 is held at an operating temperature below the transition temperatures for both the resistance element 2 and the inductance 1. Since the material for the resistance element 2 is selected to have a critical current value lower than the critical current value of the material of the inductance 1, the entire circuit loop is superconductive for current value flow less than the critical current of the resistance element 2. Accordingly, no electrical resistance is presented to current flow less than the critical current value of the resistance element 2 and once such a current is established the current flows indefinitely. Thus, a persistent circulating current may be established in the circuit loop which will continue to flow so long as the inductance 1 and the resistance element 2 remain superconducting. However, since the resistance element 2 has a critical current value lower than that of the inductance 1, the resistance element 2 is subject to being made electrically resistive by a current flowing around the loop without affecting the superconductive state of the inductance 1 where the value of the current is in excess of the critical current value of the resistance element 2 and is lower than the critical current value of the inductance 1.

In the arrangement of FIG. 1 a current pulse for initiating a persistent circulating current may be applied to the circuit loop via an energizing coil 3. The bracket and the symbol "M" indicate that the inductance 1 and the coil 3 are mutually coupled so that a pulse applied to the terminals 4 is induced in the inductance 1. If the pulse appearing across the inductance 1 is sufficiently large to produce a current around the circuit loop in excess of the critical current value of the resistance element 2, the resistance element is rendered electrically resistive, and the current within the circuit loop decays after the pulse disappears to a level approximately equal to or slightly less than the critical current value of the resistance element 2. At this point, the resistance element 2 switches from an electrically resistive state to a superconductive state and the current continues to flow around the circuit loop as a persistent circulating current so long as the resistance element 2 and the inductance 1 remain superconducting. Therefore, information may be stored in the circuit loop of FIG. 1 as a function of the direction of persistent circulating current flow by applying a pulse to the terminals 4 of a selected polarity.

In order to sense the direction of current flow within the circuit loop, a current pulse may be applied to a pair of terminals 5. Where the current pulse applied to the terminals 5 is additive with respect to a persistent circulating current flow through the resistance element 2, the total amount of current becomes sufficiently large to render the resistance element 2 electrically resistive so that a voltage appears at the terminals 5. As a result of the voltage across the resistance element 2, the direction of persistent circulating current flow within the circuit loop is reversed. Thus, after the voltage appears a persistent circulating current flows around the circuit loop in a direction opposite to the direction of persistent circulating current flow prior to the application of the pulse to the terminals 5. On the other hand, a pulse applied to the terminals 5 causing a current flow which is subtractive with respect to the persistent circulating current flowing through the resistance element 2 does not render the resistance element 2 electrically resistive so long as the net current flow does not exceed the critical current value of the resistance element 2. Accordingly, no voltage appears across the resistance element 2 in the latter case and the persistent circulating current in the circuit loop continues to flow in the same direction as before. Thus, by applying a pulse to the terminals 5 the direction of persistent circulating current flow may be ascertained by the presence or absence of a voltage across the resistance element 2.

In FIG. 2 there is shown an electrical circuit in accordance with the invention which includes two superconductive circuit loops similar to the one shown in FIG. 1. One of the circuit loops includes a resistance element 6 and an inductance 7 while the other of the circuit loops includes a resistance element 8 and an inductance 9. The inductances 7 and 9 are coupled to a common energizing coil 10 with the bracket and symbol "M" indicating mutual coupling between the coils. The black dots adjacent the ends of each of the coils 7, 9 and 10 indicate the relative polarity of the coupling in conventional fashion so that a pulse applied to the terminals 11 of the coil 10 which produces a voltage across the coil 7 with the upper end positive with respect to the lower end also produces a voltage across the coil 9 of opposite polarity with the lower end positive with respect to the upper end.

The circuit of FIG. 2 is adapted to function as a bistable circuit so that a pulse applied to the terminals 11 sets the circuit to one of two mutually exclusive conditions depending upon the polarity of the applied pulse. Thus, a pulse applied to the terminals 11 having one polarity induces currents in the circuit loops in the directions indicated by the arrows $I_A$ and $I_B$. On the other hand, a pulse applied to the terminals 11 having an opposite polarity produces current flow within the circuit loops in a direction opposite to that indicated by the arrows.

In order to sense the condition to which the circuit of FIG. 2 has been set, a signal or "read" current may be applied to both of the circuit loops via a common connection 12 from a read current source 13. In the following discussion of the operation of the circuit of FIG. 2 it is assumed that the circuit has been set to the condition in which the directions of persistent current flow are as indicated by the arrows $I_A$ and $I_B$ and that a read current pulse is applied to the circuit loops having a positive going polarity as shown.

Referring first to the right hand circuit loop of the resistance element 8 and the inductance 9, the current from the read current source 13 is additive with respect to the persistent circulating current $I_B$ flowing through the resistance element 8. Referring to the left hand circuit loop of the resistance element 6 and the inductance 7, the current from the read current source 13 is subtractive with respect to the persistent circulating current $I_A$ flowing through the resistance element 6. Thus, in the right hand circuit loop the read current from the read current source 13 tends to increase the current flowing through the resistance element 8 to a level in excess of the critical current value at which the resistance element 8 may be switched to an electrically resistive state. On the other hand, in the left hand circuit loop, the net current flowing through the resistance element 6 will at all times be less than the critical current value of the resistance element 6 if the read current is not excessive, and the resistance element 6 will not be rendered electrically resistive.

Since the read current from the read current source 13 may pass through the left hand circuit loop with zero resistance, the result is that the read current passes primarily through the left hand circuit loop to the A output circuit 14 while a minimum amount of the current from the read current source 13 flows through the right hand circuit loop to the B output circuit 15. In addition, since neither resistance element 6 or 8 is rendered substantially resistive and since the larger share of the current from the read current source 13 passes to the A output circuit 14 the direction of persistent current flow in each circuit loop remains unaffected by the read current. Thus, the arrangement of FIG. 2 provides a bistable circuit which is capable of controlling the path of an electrical current without affecting the condition to which the circuit has been set.

Appearance of the major share of the current in the A output circuit 14 indicates that the bistable circuit of FIG. 2 has been set to the condition in which the persistent circulating currents $I_A$ and $I_B$ flow in the directions indicated by the arrows. In contrast, a pulse applied to the terminals 11 having reversed polarity sets the bistable circuit of FIG. 2 to a condition in which the currents $I_A$ and $I_B$ flow in directions opposite to those indicated and the primary share of the current from the read current source 13 flows to the B output circuit 15.

An example of a circuit for performing a logical function in accordance with the concurrence of conditions established within the circuit is shown in FIG. 3. The circuit includes three pairs of superconductive circuit loops similar to those described above with respect to FIGS. 1 and 2. By applying suitable setting pulses to the circuit, a read current applied to an input terminal 16 may be directed and passed to a selected one of four output terminals 17, 18, 19 and 20. In operation, each portion of the circuit comprising a pair of superconductive circuit loops is adapted to pass the read current to one of two output circuits depending upon the condition to which that portion of the circuit has been set.

The upper portion of the circuit of FIG. 3 includes a left hand superconductive circuit loop having a resistance element 21 and an inductance 22 and a right hand superconductive circuit loop having a resistance element 23 and an inductance 24. Each of a pair of initiating coils 26 and 28 is mutually coupled to the coils 22 and 24 as indicated by the bracket and the symbol "M." The initiating coils 26 and 28 are polarized with respect to the inductances 22 and 24 as indicated by the black dots. Thus, a set pulse of a given polarity applied to the terminals 25 connected to the left hand initiating coil 26 sets the upper portion of the circuit of FIG. 1 to one condition while a set pulse of the same polarity applied to the terminals 27 connected to the right hand initiating coil 28 sets the upper portion of FIG. 3 to a second condition. Accordingly, depending upon the condition to which the upper portion of FIG. 3 is set, a read current applied to the terminal 16 is passed either to the lead 29 through the resistance element 21 or to the lead 30 through the resistance element 23.

The lower left hand portion of the circuit of FIG. 3 includes another pair of superconductive circuit loops comprising the resistance elements 31 and 32 and the inductances 33 and 34. By applying a set pulse to the terminals 35 connected to an initiating coil 36 the superconductive circuit loops of the lower left hand portion of FIG. 3 may be set to one condition of operation and by applying an initiating pulse of the same polarity to the terminals 37 connected to an initiating coil 38 the lower left hand portion of the circuit may be set to the other condition of operation.

In a similar fashion, the lower right hand portion of the circuit of FIG. 3 includes a pair of superconductive circuit loops comprising the resistance elements 39 and 40 and inductance coils 41 and 42. Pulses to set the lower right hand portion of the circuit of FIG. 3 to one condition of operation may be applied to the terminals 43 connected to an initiating coil 44 while pulses of a like polarity may be applied to the terminals 45 connected to an initiating coil 46 to set the lower right hand portion of the circuit to its other condition of operation.

In a particular arrangement in which the circuit of FIG. 3 is to be used to pass read current from the terminal 16 to a selected one of the terminals 17–20 in accordance with the concurrence of conditions within the circuit, a pulse may be selectively applied to the terminals 25 or the terminals 27 to set the upper portion of the circuit to either one of two conditions which may be designated as the A condition and the A' condition. With respect to the two lower portions of the circuit of FIG. 3, set pulses may be applied to the terminals 35 and the terminals 43 to set both the left and right hand lower portions of the circuit of FIG. 3 to a given condition which may be designated as the B condition. On the other hand, the lower portions of the circuit of FIG. 3 may be set to a second condition, designated the B' condition, by applying set pulses to the terminals 37 and the terminals 45.

Where the upper portion of the circuit of FIG. 3 is set to the A condition and the lower portions of the circuit of FIG. 3 are set to the B condition, the read current from the terminal 16 will be passed to the terminal 17 via the resistance elements 21 and 31. Where the upper portion of the circuit of FIG. 3 is set to the A condition and the lower portions of the circuit of FIG. 3 are set to the B' condition, the read current from the terminal 16 will be passed to the terminal 18 via the resistance elements 21 and 32. Where the upper portion of the circuit of FIG. 3 is set to the A' condition and the lower portions of the circuit of FIG. 3 are set to the B condition the read current from the terminal 16 will be passed to the terminal 19. Where the upper portion of the circuit of FIG. 3 is set to the A' condition and the lower portions of the circuit of FIG. 3 are set to the B' condition the read current applied to the terminal 16 will be passed to the terminal 20 via the resistance elements 23 and 40.

The operation of the circuit of FIG. 3 in passing a read current to a given output circuit in accordance with the concurrence of certain conditions existing within the circuit may be represented by means of conventional logical equations, as follows, where the output terminals 17, 18, 19 and 20 are identified by the letters C, D, E and F, respectively:

$$C=AB \quad D=AB' \quad E=A'B \quad F=A'B'$$

Although a logical circuit is illustrated in FIG. 3 in which a current may be passed to a selected one of four outputs in accordance with the concurrence of conditions within the circuit representing two binary quantities, it will be appreciated that one or more of the circuits of FIGS. 2 and 3 may be readily adapted and combined to perform other desired logical functions.

One arrangement of an inductance and a resistance element to form a circuit loop may include an insulated carrier on one side of which is supported a strip of a suitable material which forms a resistance element, as for example, an evaporated metal film. For convenience, the material of the resistance element may be extended to form terminal portions which electrically connect with an inductance element comprising several turns of wire. Although any materials having the capacity of being rendered superconducting and having the correct relationship of critical current values may be used for the resistance element and the inductance, one suitable material for the inductance wire is lead. Where lead is selected for the inductance wire, examples of suitable materials for the resistance element are tantalum, tin, or alloys thereof.

An alternative arrangement of a circuit loop may be constructed by printed circuit techniques in which suitable materials are supported by an insulating carrier in a spiral conductor to form an inductance and a strip to form a resistance element. The spiral conductor may be connected across the resistance element to form a circuit loop.

In practice, it has been found that the presence of inductance in the resistance element does not cause trouble, and the value of the inductance does not have to be large. Therefore, the inductance may be provided by distributed inductance in any part of the circuit loop. For example, a circuit loop may be constructed including a first conductor of a superconductive material having a given critical current value and a second conductor having a given critical current value differing from the given critical current value of the first conductor. Thus, one of the conductors may be rendered electrically resistive in response to current flow in excess of its critical current value without affecting the superconductive condition of the other conductor. Accordingly, conventional schematic circuit diagram symbols for the inductances and resistance elements in the schematic circuit diagrams have been used for convenience and for purposes of explanation and do not necessarily indicate the presence of conventional circuit components.

One suitable arrangement for maintaining the circuits of the invention at a proper operating temperature below the transition temperatures of the superconductive materials employed includes an exterior insulated container which is adapted to hold a coolant such as liquid hydrogen. Within the container an inner insulated container is suspended for holding a coolant, such as liquid helium in which the circuits are immersed. Where the inductance is constructed of lead and the resistance element is constructed of tantalum, a suitable operating temperature is 4.2° Kelvin which is the boiling point of helium. Other suitable operating temperatures may be obtained by regulating the vapor pressure within the helium container.

In order to enhance the magnetic field generated by currents flowing within the circuit, and hence reduce the time required to switch between conditions of operation, the conductors may be made in other than a cylindrical cross section. For example, where an evaporated layer is used for the resistance element, the element may comprise a relatively thin strip which leads to an increased strength of internal magnetic field produced by a given current which in turn lowers the critical current value and decreases the switching time. In addition, the switching time can be decreased by alloying the material with small concentrations of other chemical elements. Suitable alloying elements, for example, in the case of tin are antimony and indium. Both of these elements form solid solutions with tin so that the antimony or indium atoms are randomly scattered through the tin crystals, with the antimony or indium atoms substituting for tin atoms in the crystal lattice. Both antimony and indium differ by unity in valence from tin so that they scatter the electron waves in the tin by coulomb scattering. Hence, they contribute a large electrical resistivity per atom percent addition.

Although the following values are given by way of example only, it has been found that the value of the inductance may be of the order of 1 microhenry and the value of the resistance element in a resistive condition may be of the order of .5 ohm. Workable circuit loops for sustaining persistent current and for rapid switching have been constructed in which the physical dimensions of a strip of tin for the resistance element were as follows:

|  | Centimeters |
| --- | --- |
| Thickness | $3.4 \times 10^{-5}$ . $10.2 \times 10^{-5}$. |
| Width | 0.27 to 0.18. |
| Length | .635. |

The value of the inductance should be large enough so that the time constant for decay of circulating current $L/R$, when the resistance element is not superconducting is about as large as or larger than the delay times required for the resistance element to change from resistive to superconducting and vice versa. For a given delay time, the value of the inductance then depends upon the value of the resistance element and thus a smaller resistance will permit a smaller inductance and a consequent smaller space required for the inductance. The value of the resistance element should be large enough to generate a suitable voltage pulse but should not be so large as to generate substantial amounts of heat or require substantial amounts of power to switch the device from one mode of operation to the other.

Although the condition of a material while superconducting has been described herein as being a condition of zero resistance it will be appreciated that a small amount of resistance may be present in the superconductive condition of the material which does not necessarily affect the operation of the circuit. Accordingly, the invention should not be limited by any particular words which have been used to explain the theory of operation.

The superconductive circuit loops illustrated in the apparatus of FIGS. 2 and 3 are given as one example of a preferred arrangement for establishing currents within the superconductive components. However, the invention is not limited thereto, since suitable currents may be derived as well from external sources such as a power supply or from other equivalent electrical circuits. For example, in place of the inductance 7 and 9 and the initiating coil 10 of FIG. 2, a source of control currents may be connected to the resistance elements 6 and 8.

Nor is the invention limited to any set number of paths for the flow of the signal current through the circuit. Any number of superconductive components may be employed so long as the control current established through at least one component flows in a direction opposite to the control current flowing through at least one other component to provide at least one superconductive path for the signal current in which the signal current is subtractive with respect to the control current. Accordingly, the invention should be accorded the full scope of the annexed claims and should not be limited to the particular embodiments illustrated in the drawing and described herein.

I claim:

1. An electrical circuit including the combination of a plurality of superconductive components each of which is adapted to be rendered electrically resistive in response to current flow therethrough in excess of a predetermined critical current value, means establishing currents through each of the superconductive components having a value less than the critical current value of each of the components, a plurality of output circuits one of which is associated with each of the superconductive components and means supplying a signal current to all of the plurality of superconductive components, said current establishing means and said signal current supplying means being arranged so that the direction of signal current is subtractive with respect to the established current through at least one of said superconductive components, whereby the signal current is passed by at least one of the superconductive components to at least one of the output circuits in accordance with the directions of the established currents flowing through the superconductive components.

2. An electrical circuit including the combination of a plurality of superconductive components, means establishing electrical currents through each of the components, said components and current establishing means being arranged so that the direction of current flow established through at least one of the components is opposite to the direction of current flow through at least one other of the components and means supplying a signal current to all of the components whereby the signal current is passed through at least one of the components in which the sense of the signal current is subtractive with respect to the established current flowing through the component.

3. An electrical circuit including the combination of a plurality of superconductive components each of which is adapted to be rendered electrically resistive in response to current flow therethrough in excess of a predetermined critical current value, means establishing condition representing electrical currents through each of the components having a value less than said critical current value, said components and current establishing means being arranged so that the direction of condition representing current flow through at least one of the components is opposite to the direction of condition representing current flow through at least one other of the components and means supplying a signal current to all of the components whereby the signal current is passed through at least one of the components in which the sense of the signal current is subtractive with respect to the condition representing current flowing through the component.

4. An electrical circuit including the combination of a plurality of superconductive components each of which is adapted to be rendered electrically resistive in response to currents in excess of a predetermined critical current value, means establishing condition representing electrical currents through each of the components having a value less than said critical current value, said components and electrical current establishing means being arranged so that the direction of condition representing current flow through at least one of the components is opposite to the direction of condition representing current flow through at least one other of the components, a plurality of output circuits associated with the superconductive components, and means supplying a signal current to all of the components whereby the signal current is passed to at least one of the output circuits through at least one of the components in which the sense of the signal current is subtractive with respect to the condition representing current flowing through the component.

5. An electrical circuit including the combination of a plurality of superconductive components each of which is adapted to be rendered electrically resistive in response to current flow therethrough in excess of a predetermined critical current value, means establishing condition representing currents through each of the superconductive components having a value less than the critical current value of each of the components, a plurality of output circuits one of which is associated with each of the components, and means for applying an electrical current pulse to all of the plurality of superconductive components, said condition representing current establishing means and said electrical current applying means being arranged so that the applied electrical current pulse is subtractive with respect to at least one of the established condition representing currents, whereby the pulse is passed by at least one of the superconductive components to at least one of the output circuits in accordance with the directions of the condition representing currents flowing through the superconductive components.

6. An electrical circuit including the combination of a plurality of superconductive components each of which is adapted to be rendered electrically resistive in response to currents in excess of a predetermined critical current value, means establishing condition representing currents through each of the components having a value less than said critical current value, said components and current establishing means being arranged so that the current sustained through at least one of the components is in a direction opposite to the direction of current flow through at least one other of the components, and means applying an electrical current pulse to all of the plurality of components whereby the pulse is passed through at least one of the components in which the sense of the pulse is subtractive with respect to the condition representing current flowing through the component.

7. An electrical circuit including the combination of a plurality of superconductive components each of which is adapted to be rendered electrically resistive in response to current flow in excess of a predetermined critical current value, means establishing electrical currents through each of the components having a value less than the critical current value, said components and said current establishing means being arranged so that the established current flowing through at least one of the components flows in a direction opposite to the established current flowing through at least one other of the components, a plurality of separate output circuits one of which is associated with each of the components, and means coupled to all of the plurality of superconductive components for applying an electrical pulse to the components, whereby the electrical pulse is passed to at least one selected output circuit through a component in which the sense of the electrical current pulse is subtractive with respect to the established current flowing therethrough.

8. An electrical circuit including in combination a plurality of superconductive circuit loops each of which is adapted to sustain a persistent circulating current around the loop, means establishing persistent circulating currents in said loops, said superconductive circuit loops and said current establishing means being arranged to at all times sustain a persistent circulating current in one of the circuit loops in a direction opposite to the persistent circulating current sustained by at least one other of the circuit loops, and means supplying a signal current to all of said plurality of superconductive circuit loops whereby said signal current is passed through at least one of the superconductive circuit loops in accordance with the direction of persistent circulating current flow established therein.

9. An electrical circuit including in combination a plurality of superconductive circuit loops, each of which is adapted to sustain a persistent circulating current around the loop so long as the loop remains superconductive, means establishing persistent circulating currents in said loops, a common connection between like portions of each of the plurality of circuit loops, a plurality of separate output circuits one of which is connected to each of the plurality of circuit loops, and means for supplying a signal current to the common connection, whereby the signal current is passed to at least one of the output circuits in accordance with the directions of persistent circulating current flow established in each of the circuit loops.

10. An electrical circuit including the combination of a plurality of superconductive circuit loops each of which is adapted to sustain a persistent circulating current around the loop, means establishing persistent circulating currents in said loops, said plurality of loops and said current establishing means being arranged so that at least one of the loops sustains a persistent circulating current in a direction opposite to the persistent circulating current sustained by at least one other of the loops, a common connection to each of the circuit loops, a plurality of separate output circuits connected to the circuit loops, and means supplying a signal current to the common connection whereby the signal current is passed to the output circuits in accordance with the direction of persistent current flow established in each of the plurality of superconductive circuit loops.

11. An electrical circuit including the combination of a plurality of superconductive electrical circuit loops each of which is adapted to sustain a persistent circulating current around the loop in a selected direction, means coupled to the loops for establishing persistent circulating currents in the loops, said plurality of circuit loops and said current establishing means being arranged so that at least one of the circuit loops sustains a persistent circulating current in a direction opposite to the persistent circulating current sustained by at least one other of the circuit loops, a plurality of separate output circuits one of which is associated with each of the circuit loops, and means supplying electrical current pulses to all of the circuit loops, whereby the electrical current pulses are passed to at least one of the output circuits in accordance with the direction of persistent current flow established in the circuit loop associated therewith.

12. An electrical circuit including in combination a plurality of superconductive circuit loops each of which includes a component which is capable of being rendered electrically resistive in response to current flow in excess of a predetermined critical current value, means energizing said superconductive circuit loops to cause each of said loops to sustain a persistent circulating current in a selected direction around the loop so long as the loop remains superconducting, and means for supplying a signal current to all of said plurality of circuit loops whereby the signal current is passed to at least one output circuit through a superconductive component with the signal current being subtractive with respect to the persistent current flowing through the component.

13. An electrical circuit including in combination a plurality of superconductive circuit loops each of which includes a component which is capable of being rendered electrically resistive in response to current flow in excess of a predetermined critical current value, means energizing said superconductive circuit loops to cause each of said loops to sustain a persistent circulating current in a selected direction around the loop so long as the loop remains superconducting, said circuit loops and said energizing means being arranged so that at least one of the circuit loops sustains a persistent circulating current around the loop in a direction opposite to the direction of persistent circulating current flow in at least one other of the circuit loops, a plurality of separate output circuits one of which is connected serially with each of the circuit loops, and means for supplying a signal current to all of said plurality of circuit loops whereby the signal current is passed to at least one output circuit through a superconductive component with the signal current being subtractive with respect to the persistent current flowing through the component.

14. An electrical circuit including the combination of a pair of superconductive circuit loops each of which includes a superconductive component which is capable of becoming electrically resistive in response to current flow in excess of a predetermined critical current value, an initiating coil inductively coupled to both of the circuit loops, means for applying a set pulse to the initiating coil to establish persistent circulating currents in each of the loops in mutually opposite directions, a common connection to both of the circuit loops, and means supplying a signal current to the common connection whereby the signal current is passed by a superconductive component of one of the circuit loops through which the signal current is subtractive with respect to the persistent circulating current flowing through the component.

15. An electrical circuit including the combination of a pair of superconductive circuit loops each of which includes a superconductive component which is capable of becoming electrically resistive in response to current flow in excess of a predetermined critical current value, an initiating coil inductively coupled to both of the circuit loops, means for applying a set pulse to the initiating coil to establish persistent circulating currents in each of the loops in mutually opopsite directions, a common connection to both of the circuit loops, a pair of output circuits one of which is connected to each of the circuit loops, and means supplying a signal current to the common connection whereby the signal current is passed to one of the output circuits via a superconductive component of one of the circuit loops through which the signal current is subtractive with respect to the persistent current flowing through the component.

References Cited in the file of this patent

UNITED STATES PATENTS

| | | |
|---|---|---|
| 2,832,897 | Buck | Apr. 29, 1958 |
| 2,877,448 | Nyberg | Mar. 10, 1959 |
| 2,930,908 | McKeon, et al. | Mar. 29, 1960 |

OTHER REFERENCES

The Cryotron, "A Superconductive Computer Component," by D. A. Buck, from Proceedings of the IRE, April 1956, pages 482–493.